(12) United States Patent
Holsinger et al.

(10) Patent No.: US 9,068,837 B2
(45) Date of Patent: Jun. 30, 2015

(54) METHOD OF OPERATING A NAVIGATION SYSTEM

(75) Inventors: David J. Holsinger, Chicago, IL (US);
Ashish B. Tajpuria, Chicago, IL (US);
Jeremy S. Agulnek, Chicago, IL (US)

(73) Assignee: HERE Global B.V., Veldhoven (NL)

( * ) Notice: Subject to any disclaimer, the term of this patent is extended or adjusted under 35 U.S.C. 154(b) by 572 days.

(21) Appl. No.: 12/696,400

(22) Filed: Jan. 29, 2010

(65) Prior Publication Data
US 2011/0191019 A1    Aug. 4, 2011

(51) Int. Cl.
*G01C 21/00*    (2006.01)

(52) U.S. Cl.
CPC ...................... *G01C 21/00* (2013.01)

(58) Field of Classification Search
None
See application file for complete search history.

(56) References Cited

U.S. PATENT DOCUMENTS

| | | | |
|---|---|---|---|
| 6,324,476 B1 | 11/2001 | Trovato | 701/301 |
| 6,424,910 B1 * | 7/2002 | Ohler et al. | 701/533 |
| 6,487,495 B1 * | 11/2002 | Gale et al. | 701/461 |
| 6,865,538 B2 * | 3/2005 | Chithambaram et al. | 705/1.1 |
| 7,376,511 B2 | 5/2008 | Szabo et al. | 701/210 |
| 7,444,156 B2 * | 10/2008 | Boss et al. | 455/456.3 |
| 7,606,661 B2 | 10/2009 | Kwak | 701/209 |
| 7,894,986 B2 * | 2/2011 | Hegedus et al. | 701/426 |
| 8,818,407 B2 * | 8/2014 | Granito et al. | 455/456.1 |
| 2004/0030490 A1 * | 2/2004 | Hegedus et al. | 701/200 |
| 2005/0073407 A1 * | 4/2005 | Giraldin et al. | 340/539.2 |
| 2008/0288545 A1 * | 11/2008 | Hegedus et al. | 707/104.1 |

OTHER PUBLICATIONS

Michael Boland, "Google Maps Integrates User Reviews (Finally)", Jun. 19, 2007, http://searchenginewatch.com/author/1795/michael-boland).*
Author unknown, "TechEase Blog pdf" pp. 1-5, dated Jan. 11, 2007 from http://etc.usf.edu/techease/win/internet/how-do-i-use-online-map-services/ and search examples on pp. 4 and 5 from http://maps.google.com.*

* cited by examiner

*Primary Examiner* — Redhwan K Mawari
*Assistant Examiner* — Edward Torchinsky
(74) *Attorney, Agent, or Firm* — Lempia Summerfield Katz LLC (57) ABSTRACT

A method of operating a navigation system is disclosed. A request for a route to a large scale point of interest having multiple entrances is obtained. Data indicating a meeting point for the large scale point of interest is obtained from a geographic database associated with the navigation system. The meeting point defines a location within the large scale point of interest or proximate to the large scale point of interest. A route to the meeting point location is calculated and the meeting point location is sent to another user.

14 Claims, 7 Drawing Sheets

METHOD OF OPERATING A NAVIGATION SYSTEM

BACKGROUND OF THE INVENTION

The present invention relates to a method and system for operating a navigation system, and more particularly to a method and system for providing a route to a meeting point associated with a destination location.

Navigation systems are available that provide end users with various navigation-related functions and features. For example, some navigation systems are able to determine an optimum route to travel along a road network from an origin location to a destination location in a geographic region. Using input from the end user, the navigation system can examine various potential routes between the origin and destination locations to determine the optimum route. The navigation system may then provide the end user with information about the optimum route in the form of guidance that identifies the maneuvers required to be taken by the end user to travel from the origin to the destination location. Some navigation systems are able to show detailed maps on displays outlining the route, the types of maneuvers to be taken at various locations along the route, locations of certain types of features, and so on.

In order to provide these and other navigation-related functions and features, navigation systems use geographic data. The geographic data may be in the form of one or more geographic databases that include data representing physical features in the geographic region. The geographic database includes information about the represented geographic features, such as one-way streets, position of the roads, speed limits along portions of roads, address ranges along the road portions, turn restrictions at intersections of roads, direction restrictions, such as one-way streets, and so on. Additionally, the geographic data may include points of interests, such as businesses, facilities, restaurants, hotels, airports, gas stations, stadiums, police stations, and so on.

Although navigation systems provide many important features, there continues to be room for new features and improvements. One area in which there is room for improvement relates to providing routing and guidance to a large scale point of interest, such as a stadium, shopping mall, public space, outdoor plaza or park. For example, when several friends wish to meet at a stadium, they may have difficulty finding each other in the large area that often is crowded with other people. Accordingly, it would be beneficial to provide improved routing and guidance to allow users to meet each other.

SUMMARY OF THE INVENTION

To address these and other objectives, the present invention comprises a method of operating a navigation system. The method obtains a request from a first user for a route to a large scale point of interest having multiple entrances. The method obtains data from a geographic database associated with the navigation system indicating a meeting point for the large scale point of interest. The meeting point defines a location within the large scale point of interest or proximate to the large scale point of interest. The method calculates a route to the meeting point location and sends the meeting point location to a second user.

According to another aspect, the present invention comprises a navigation system. The navigation system comprises a processor, a geographic database associated with the processor, and a route calculation program executed on the processor. The route calculation program obtains a request for a route to a destination, obtains data from the geographic database to identify a meeting point associated with the destination, and calculates a route to a location of the meeting point.

According to a further aspect, the present invention comprises a method of operating a navigation system. The method obtains a request from for a route to a destination. The method obtains data from a geographic database associated with the navigation system indicating a meeting point for the destination. The method calculates a route to the meeting point.

BRIEF DESCRIPTION OF THE DRAWINGS

An exemplary embodiment of the present invention is described herein with reference to the following drawings.

DETAILED DESCRIPTION OF THE PRESENTLY PREFERRED EMBODIMENTS

I. Navigation System

Figure 1:
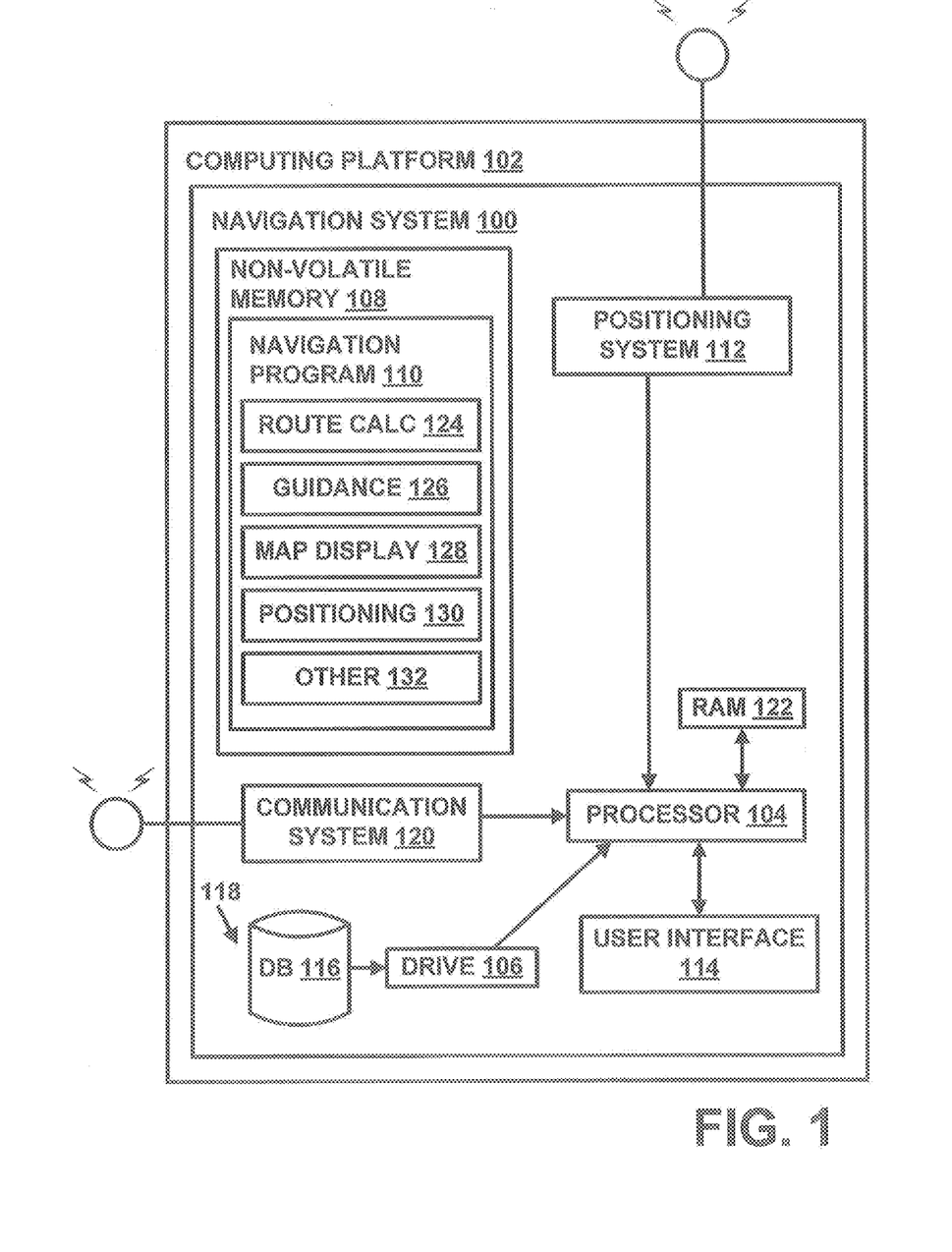
FIG. 1 is a block diagram of a navigation system, according to an exemplary embodiment.

FIG. 1 is a block diagram of a navigation system 100 associated with a computing platform 102, such as an in-vehicle navigation device, a personal navigation device, a mobile computer, mobile telephone, personal digital assistant (PDA), personal computer, or any other computer, according to an exemplary embodiment. The navigation system 100 is a combination of hardware and software components. In one embodiment, the navigation system 100 includes a processor 104, a drive 106 connected to the processor 104, and a non-volatile memory storage device 108 for storing navigation application software programs 110 and possibly other information.

The navigation system 100 also includes a positioning system 112. The positioning system 112 may utilize GPS-type technology, a dead reckoning-type system, or combinations of these or other systems, all of which are known in the art. The positioning system 112 may include suitable sensing devices that measure the traveling distance speed, direction, orientation and so on. The positioning system 112 may also include a GPS system. The positioning system 112 outputs a signal to the processor 104. The navigation application software programs 110 that run on the processor 104 use the signal from the positioning system 112 to determine the location, direction, orientation, etc., of the computing platform 102.

The navigation system 100 also includes a user interface 114 that allows the end user to input information into the navigation system 100 and obtain information from the navigation system 100. The input information may include a request for navigation features and functions of the navigation system 100. To provide navigation features and functions, the navigation system 100 uses a geographic database 116 stored on a computer readable storage medium 118. In one embodiment, the storage medium 118 is installed in the drive 106 so that the geographic database 116 can be read and used by the navigation system 100. In one embodiment, the geographic database 116 may be a geographic database published by NAVTEQ North America, LLC of Chicago, Ill. The storage medium 118 and the geographic database 116 do not have to be physically provided at the location of the navigation system 100. In alternative embodiments, the storage medium 118, upon which some or the entire geographic database 116 is stored, may be located remotely from the rest of the navigation system 100 and portions of the geographic data provided via a communications system 120, as needed.

In one exemplary type of system, the navigation application software programs 110 load from the non-volatile memory storage device 108 into a random access memory (RAM) 122 associated with the processor 104. The processor 104 also receives input from the user interface 114. The navigation system 100 uses the geographic database 116 stored on the storage medium 118, possibly in conjunction with the outputs from the positioning system 112 and the communications system 120, to provide various navigation features and functions. The navigation application software programs 110 may include separate applications (or subprograms) that provide the various navigation-related features and functions. The navigation functions and features may include route calculation 124 (wherein a route from an origin to a destination is determined), route guidance 126 (wherein detailed directions are provided for reaching a desired destination), map display 128 (wherein a map depicting the current position and route to travel are shown on a display), and positioning 130 (e.g., map matching). Other functions and programming 132 may be included in the navigation system 100 including people and business finding services (e.g., electronic yellow and white pages), point of interest searching, destination selection, and location base advertising services.

The navigation application software programs 110 may be written in a suitable computer programming language such as C, although other programming languages, such as C++ or Java, are also suitable. All of the components described above may be conventional (or other than conventional) and the manufacture and use of these components are known to those of skill in the art.

In alternative embodiments, the navigation system 100 includes local components, located physically with an end user, that communicate with remote components, located remotely from the end user. In this embodiment, the remote components include a navigation services server. The navigation application software programs 110 and the geographic database 116 reside with the navigation server. The local components of the navigation system communicate with the remote components via a communication link. The communication link may use any suitable technology and/or protocols that are currently available, as well as technology and/or protocols that become available in the future. A portion of the communications link may include a wireless portion that enables two-way communication between the local components and the remote components. The wireless portion may be implemented by any suitable form of wireless communication, including cellular, PCS, satellite, FM, radio, Bluetooth®, other long and short range transmission technologies or technologies that may be developed in the future.

II. Geographic Database

Figure 2:
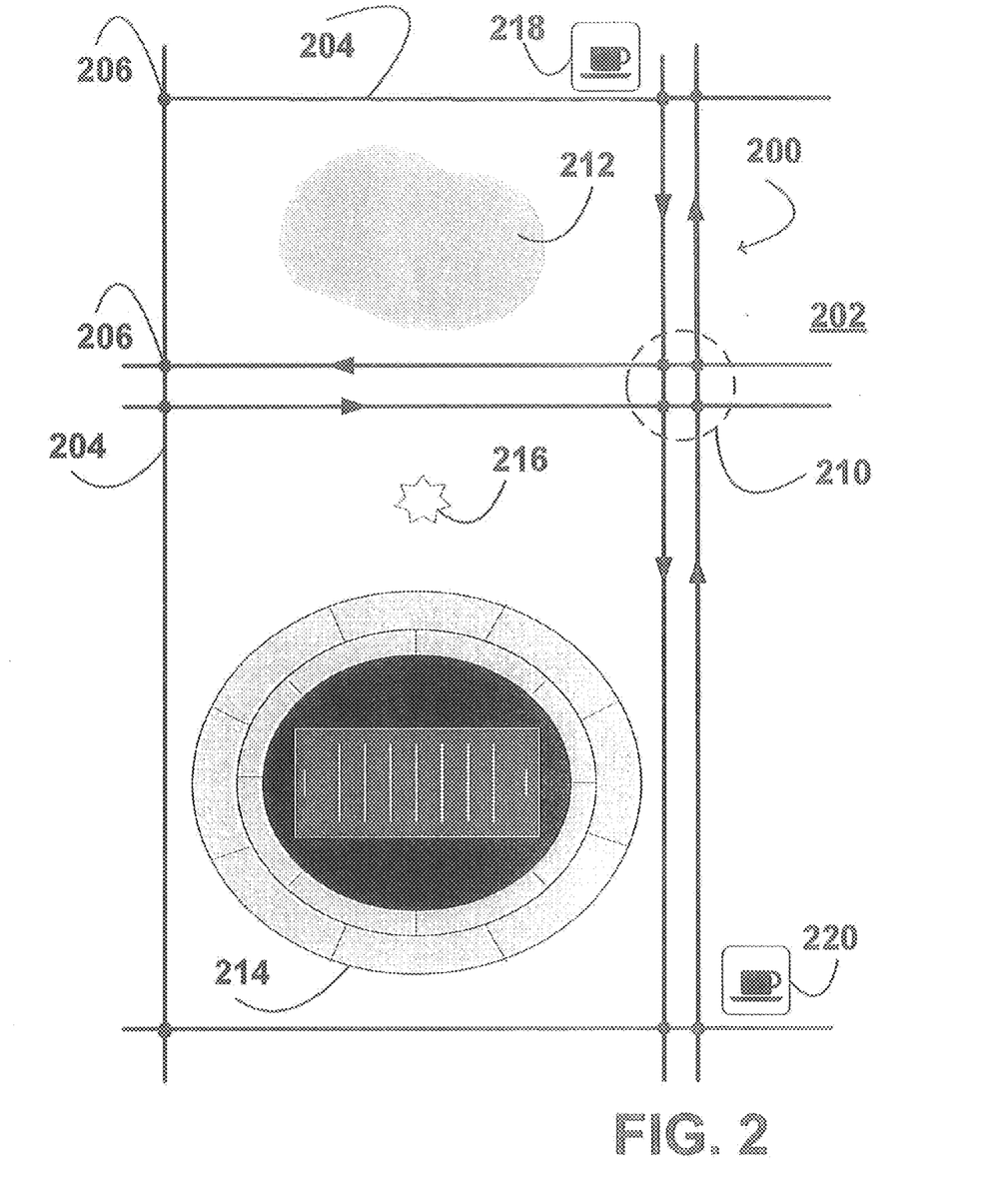
FIG. 2 shows a map of a geographic region.

In order to provide navigation-related features and functions to the end user, the navigation system 100 uses the geographic database 116. The geographic database 116 includes information about one or more geographic regions. FIG. 2 illustrates a map 200 of a portion of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

The map 200 illustrates part of a road network in the geographic region 202. The road network includes, among other things, roads and intersections located in the geographic region 202. Each road in the geographic region 202 is composed of one or more road segments 204. A road segment 204 represents a portion of the road. Each road segment 204 is shown to have associated with it two nodes 206; one node represents the point at one end of the road segment and the other node represents the point at the other end of the road segment. The node 206 at either end of a road segment 204 may correspond to a location at which the road meets another road, i.e., an intersection, or where the road dead-ends. The road segments 204 may include sidewalks and crosswalks for travel by pedestrians.

As shown in FIG. 2, the geographic region 202 also includes complex features 208, such as a complex intersection that comprises multiple road segments and multiple nodes. The geographic region 202 further includes other cartographic features 212, such as lakes, forests, rivers, hills, mountains and so on. The geographic region further includes points of interest, such as businesses, facilities, restaurants, hotels, gas stations, stadiums, police stations, and so on. Referring to FIG. 2, the geographic region 202 includes a stadium 214 having a fountain 216 on the stadium grounds and coffee shops 218 and 220. Some of the points of interest cover a considerable amount of geographic area, such as the stadium 214, a shopping mall, public park, plaza and so on.

Figure 3:
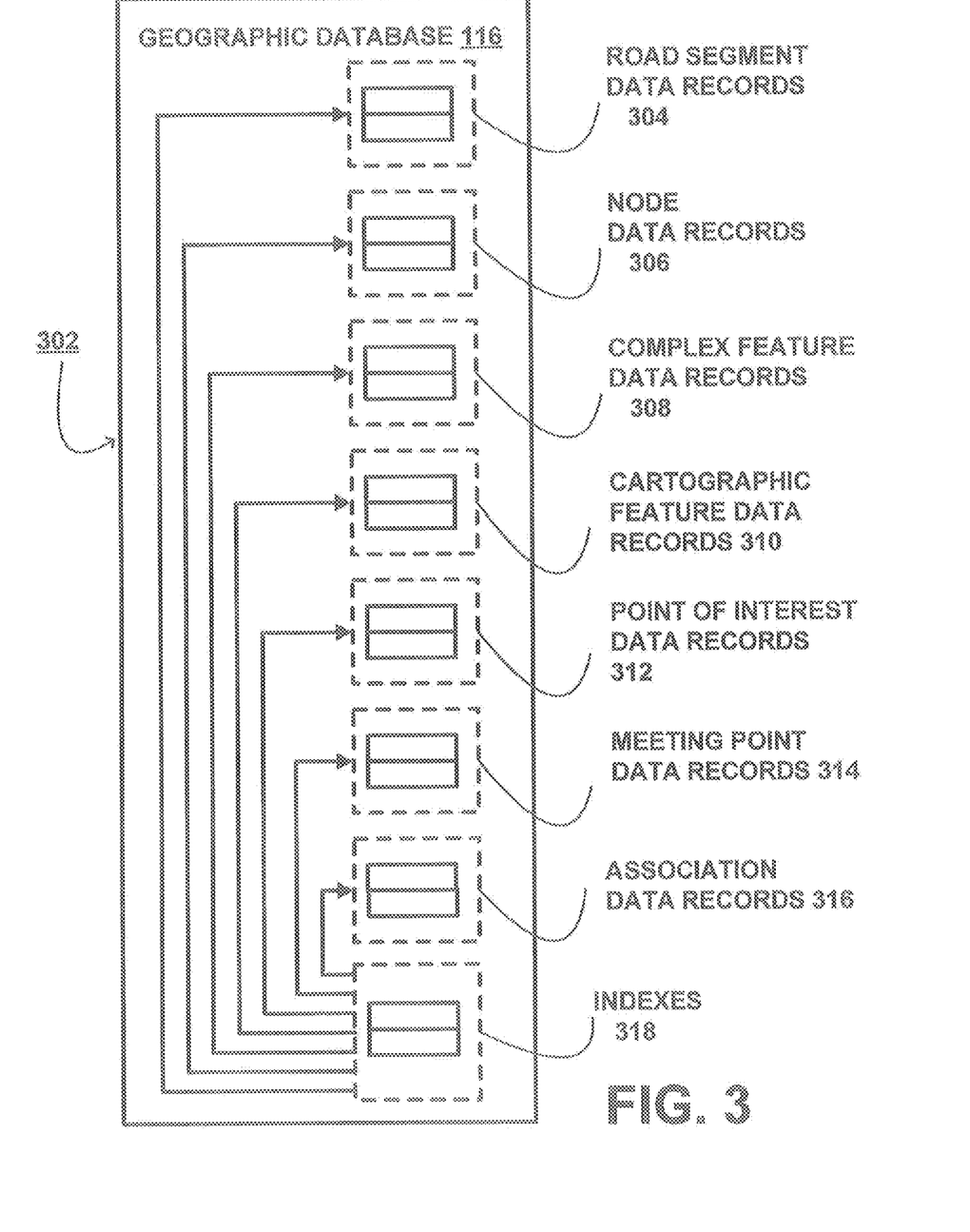
FIG. 3 is a block diagram of a geographic database that represents the geographic region included in the navigation system depicted in FIG. 1.

Referring to FIG. 3, the geographic database 116 contains data 302 that represents some of the physical geographic features in the geographic region 202 depicted in FIG. 2. The data 302 contained in the geographic database 116 includes data that represent the road network for travel by vehicles and the pedestrian network for travel by pedestrians. In the embodiment of FIG. 3, the geographic database 116 that represents the geographic region 202 contains at least one road segment data record 304 (database record may also be referred to as "entity" or "entry") for each road segment 204 in the geographic region 202. The geographic database 116 that represents the geographic region 202 also includes a node data record 306 for each node 212 in the geographic region 202. The terms "nodes" and "segments" and "links" represent only one terminology for describing these physical geographic features, and other terminology for describing these features is intended to be encompassed within the scope of these concepts.

The geographic database 116 also contains complex feature data records 308 that represent complex features, such as complex intersections or grouped features that contain multiple road segments and nodes. The geographic database 116 further contains cartographic feature data records 310 that represent cartographic features, such as lakes, rivers, railroads, airports, parks, woodland and so on. The geographic database 116 also contains point of interest data records 312 that represent points of interest, such as businesses, facilities, restaurants, hotels, gas stations, stadiums, police stations, and so on. The point of interest data may include point of interest records comprising a type of point of interest, location of the point of interest, a phone number, hours of operation, etc.

Moreover, the geographic database 116 contains meeting point data records 314 and association data records 316 that will be described in detail below. The geographic database 116 may also include other kinds of data. The other kinds of data 312 may represent other kinds of geographic features or anything else. The geographic database 116 also includes indexes 318. The indexes 318 may include various types of indexes that relate the different types of data to each other or that relate to other aspects of the data contained in the geographic database 116. For example, the indexes 318 may relate the nodes in the node data records 306 with the end points of a road segment in the road segment data records 304. As another example, the indexes 314 may relate point of interest data in the point of interest data records 312 with a road segment in the road segment data records 304.

Figure 4:
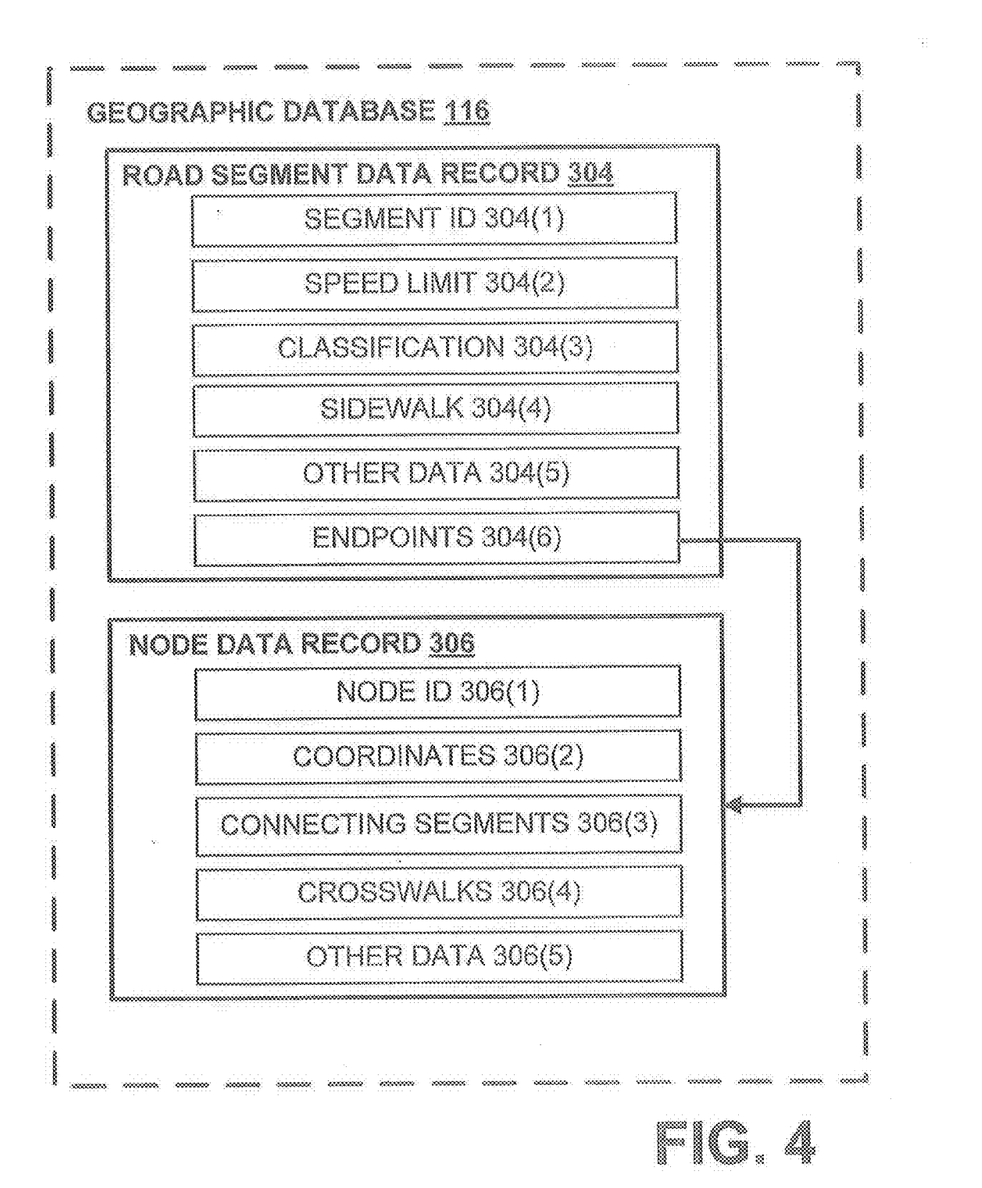
FIG. 4 is a block diagram of components of data records contained in the geographic database depicted in FIG. 3.

FIG. 4 shows some of the components of a road segment data record 304 contained in the geographic database 116. The road segment data record 304 includes a segment ID 304(1) by which the data record can be identified in the geographic database 116. Each road segment data record 304 has associated with it information (such as "attributes", "fields", etc.) that describes features of the represented road segment. The road segment data record 304 may include data 304(2) that indicate a speed limit or speed category (i.e., the maximum permitted vehicular speed of travel) on the represented road segment. The road segment data record 304 may also include data 304(3) that indicate a classification such as a rank of a road segment that may correspond to its functional class.

The road segment data record also includes data 304(4) that indicate whether a sidewalk is associated with the road segment as well as attributes information for the sidewalk. The road segment data record 304 may also include or be associated with other data 304(5) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name or names by which the represented road segment is known, the length of the road segment, the grade of the road segment, the street address ranges along the represented road segment, the permitted direction of vehicular travel on the represented road segment, whether the represented road segment is part of a controlled access road (such as an expressway), a ramp to a controlled access road, a bridge, a tunnel, a toll road, a ferry, and so on.

The road segment data record 304 also includes data 304(6) identifying the endpoints of the road segment and the location (e.g., the latitude and longitude) of the endpoints. In one embodiment, the endpoint data 304(6) references node data records 306 defined for the nodes corresponding to the endpoints of the represented road segment. By convention, each road segment is considered to have a "reference" or "left: endpoint and a "non-reference" or "right" endpoint. The left endpoint may be the node having greater longitudinal coordinates, or in the case in which the longitudinal coordinates are the same, the node having the lesser latitude. Of course, which node is defined as the left or right endpoints can be alternatively defined.

Each node data record 306 includes a node ID 306(1) by which the record can be identified in the geographic database 116. The node data record 306 also includes data 306(2) identifying the geographic coordinates (e.g., the latitude, longitude, and optionally altitude) of the represented node. The node data record 306 also includes data 306(3) identifying road segments that connect to the node to form an intersection. For example, a node identified by a node ID 306(1) may represent an intersection of two roads. At the intersection, each of the two roads may be represented by two road segments (located on opposite sides of the center of the intersection) each having an endpoint at the node. In this example of a standard four-way intersection, the connecting segment data 306(3) includes four segments IDs 304(1) identifying the four road segments that connect to the node to form the intersection.

The node data record 204 also include data 306(4) that indicate whether a crosswalk is present as well as attribute information for the crosswalk. The node data record 306 may also include other data 306(5) that refer to various other attributes of the nodes.

III. Collecting Data for Meeting Points

It is desired to provide support for the end user to get a route and guidance instructions to meet another end user at a large scale point of interest, such as a stadium, shopping mall, public space, outdoor plaza or park. For example, when several friends wish to meet at a stadium, they may have difficulty finding each other in the large area that often is crowded with other people. Accordingly, it would be beneficial to provide meeting points within or proximate to the large scale points of interests.

A geographic database developer identifies and collects information relating to the geographic features of the geographic region useful for establishing meeting points. In one embodiment, a geographic researcher travels the geographic region to collect information relating to geographic features. As the geographic research travels the geographic region, images and/or video of the road network and the area surrounding the road are collected and stored on a storage medium. The geographic research collects information directly when traveling in the geographic region and/or collects information after traveling in the geographic region by later examining the video and images. In another embodiment, the geographic researcher uses aerial images to collect information. In a further embodiment, the geographic researcher uses local knowledge including recommendations from local experts familiar with the region.

Figure 5:
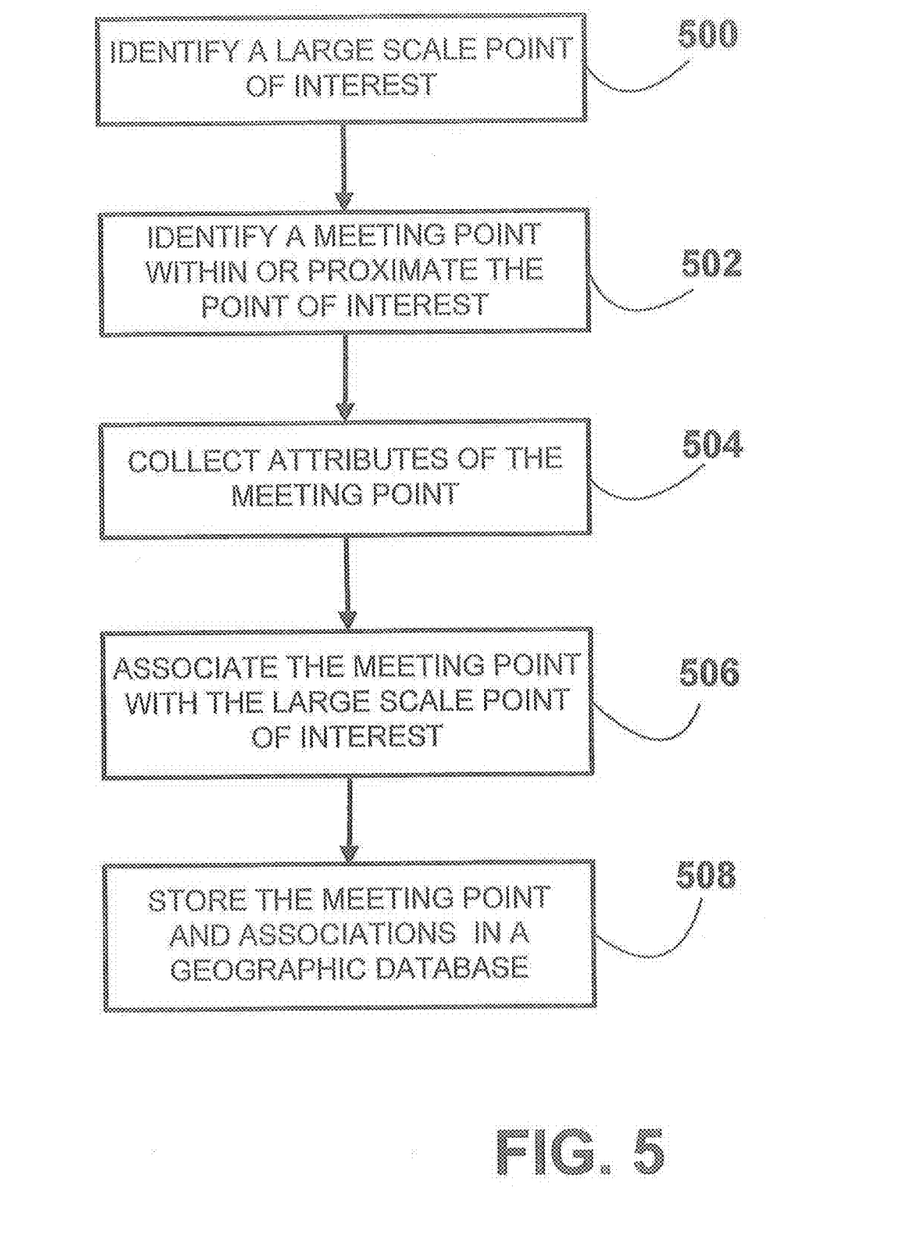
FIG. 5 is a flow chart for collecting meeting point information.

FIG. 5 illustrates a flow chart of the steps for collecting meeting point information. The geographic researcher uses a computer work station, comprising a user interface, a display, a processor and a computer readable storage medium to carry out the steps of this flow chart.

At step 500, the geographic researcher identifies a large scale point of interest. In one embodiment, the geographic researcher displays a satellite image of a portion of the geographic region on the work station to identify the large scale point of interest. The large scale point of interest is a point of interest that covers a considerable amount of geographic area, such as a stadium, a shopping mall, public transportation station, public park, plaza, large facility, and so on. Large scale points of interest typically have multiple entrances and exits. Moreover, some large scale points of interest have no separately identifiable entrance or exit, such as an open area of a park or plaza. Additionally, the large scale points of interest may have multiple features and points of interest located within their respective areas, such as shopping malls that include multiple stores, restaurants, parking, and other features.

At step 502 of FIG. 5, the geographic researcher creates a meeting point for the identified large scale point of interest. In one embodiment, the meeting point is a location proximate to or within the large scale point of interest. The meeting point provides a location that may be used to allow several users to meet at the large scale point of interest. Because the large scale point of interest, such as the stadium 214, covers a large area that often is crowded with other people, the large scale point of interest provides many possible meeting points. In one embodiment, a feature readily visible to a pedestrian on the grounds of the large scale point of interest is selected as the meeting point, such as the fountain 216 on the grounds of the stadium 214. Additionally, the feature selected for the meeting point, such as the fountain 216, is visibly distinguishable from the surroundings allowing the user to recognize the feature.

In another embodiment, a point of interest, such as the coffee shop 218 proximate the stadium 214, is selected as the meeting point. More than one meeting point may be created for the large scale point of interest. In one embodiment, a meeting point is created based on the end user group that will use the meeting point. For example, several different meeting points may be created including a family-friendly meeting point, a handicap accessible meeting point, a teenager meeting point, a young adults meeting point, a smoker's meeting point, a non-smoking meeting point and so on. The meeting point may be a single point or a defined polygonal feature.

At step 504, the geographic researcher collects attribute information for the meeting point. When the meeting point is created, the geographic researcher records the latitude and longitude (and altitude) position information for the meeting point. In one embodiment, the road segment, node and/or pedestrian path on which the meeting point is proximate to or is located on as well as on which side of the road segment or pedestrian path the meeting point is visible from are recorded. Other attribute information is collected including the type of meeting point, such as a family-friendly meeting point, a handicap accessible meeting point, a teenager meeting point, a young adults meeting point, a smoker's meeting point, a non-smoking meeting point and so on.

Additional attribute information collected by the geographic researcher includes a preferred name for the meeting point. The preferred name describes a visible characteristic or a visually distinguishing aspect of the feature, such as the color of the feature, shape of the feature, age of the feature, building materials of the feature, style of the feature, architectural description, decorative features, other visual properties including luster and sheen (shiny or dull) of the feature, motion or perceived motion of a portion of the feature, and/or any visible attribute that distinguishes the feature from other features in the surrounding area. For example, the special name may be pink fountain of a dolphin, dome-shaped fountain, glass and bronze fountain, neon sign of a bird attached to building, and so on. Furthermore, the preferred name may include various adjectives to describe the feature, such as grand old fountain. In one embodiment, the preferred name may be a locally know name or nickname for the meeting point, such as "Malcolm Fountain." In addition to determining a preferred name for the meeting point, a base name is determined, such as coffee shop for the coffee shop 218. In a further embodiment, the brand name of the coffee shop may be recorded. In another embodiment, different preferred names may be collected for different end users. For example, one preferred name may be collected for female end users and another preferred name for male end users; one preferred name may be collected for local end users and another preferred name for tourists or end users that do not reside is the geographic region. The geographic researcher may also capture an image of the meeting point.

At step 506, the geographic researcher associates the meeting point with the large scale point of interest; for example, associating the fountain 216 and coffee shop 218 with the stadium 214. At step 508, the meeting point, meeting point attribute information, preferred name and association information are stored in the geographic database. The geographic database is stored on a computer readable medium.

Although the above method has been described for creating meeting points for large scale points of interest, meeting points for other features may be created following the steps of FIG. 5. Meeting points for cartographic features, intersections, complex intersections, road segments, administrative areas, neighborhoods and so on may be created. For example, a meeting point of a coffee shop 218 proximate the lake 212 is a meeting point for the cartographic feature of the lake. For example, several meeting points may be established for a city center and/or neighborhood. Additionally, a meeting point may be established for a grouping of buildings, such as an office park. Moreover, a meeting point may be established for the group of buildings along a city plaza. Furthermore, meeting points may be established for parks, shopping malls, parking lots, airports, train stations, hospitals, universities, corporate campus, tourist areas, waterfront spaces, beaches, and so on.

In another embodiment, the meeting points may be established through an auction or bidding process in which business owners and advertisers pay to establish meeting points proximate to or at that their facilities. For example, the geographic researcher may request bids for a meeting point associated with the stadium 214. Various business owners and advertisers may make bids to establish their facility as the meeting point. The business owner or advertiser with the highest bid specifies the location of the meeting point for the stadium, such as the coffee shop 218. The geographic researcher then assigns the meeting point to the location specified by the winning bidder. The geographic researcher may auction different meeting points for the different end users, such as for families, teenagers, young adults, or other interest groups. Additionally, the geographic researcher may auction meeting points for a large scale point of interest for different events held at the point of interest, such as sporting events and concerts.

In a further embodiment, the meeting points as well as the large area points of interest may be identified using social media, such as photograph sharing websites, social networks and other community channels. For example, a large scale point of interest may be identified by identifying a geographic location or area that has numerous associated photographs, such as photographs taken at a stadium, park or city plaza. Additionally, those photographs taken at or proximate to the identified large scale point of interest may be examined to identify a meeting point. For example, a significant number of photographs taken in a park may depict a fountain; accordingly, the fountain may be identified as an appropriate meeting point for the park. Moreover, meeting points may also be identified via crowd sourcing. For example, data indicating the locations of cell phones used by teenagers may indicate that a large number of teenagers gather at a fountain at a stadium prior to events; accordingly, the fountain is identified as a meeting point for teenagers at the stadium.

In a further embodiment, the meeting points may be established using local knowledge and recommendations from local experts. For example, a community of map users or local residents may recommend various meeting points. The geographic researcher may invite local residents or map users to identify a favorite meeting place near the large scale point of interest. The geographic researcher evaluates the submissions from local residents or map users and creates the meeting points in a similar manner as described above in conjunction with FIG. 5.

IV. Geographic Database with Meeting Points and Association Data

The meeting points, meeting point attribute information and association data collected as described above are included in the geographic database 116 that represents some of the physical geographic features in the geographic region 202. In the exemplary embodiment of FIG. 3, the geographic database 116 that represents the geographic region 202 contains at least one meeting point database record 314 for each meeting point created in the geographic region 202. The geographic database 116 also includes association data records 316 to provide associations between the meeting points and other database records.

Figure 6:
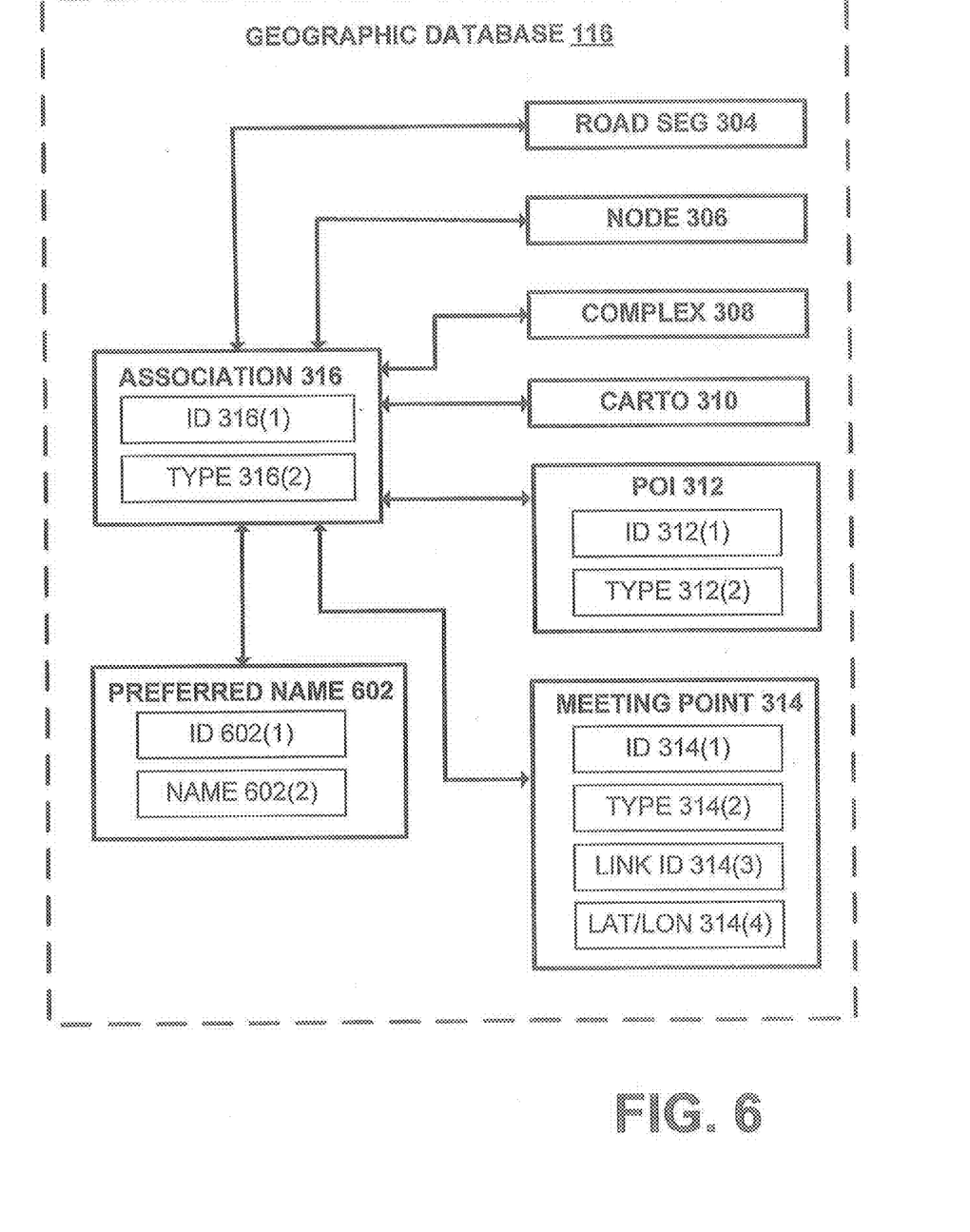
FIG. 6 is a block diagram of components of data records contained in the geographic database.

FIG. 6 shows some of the components of a meeting point database record 314 and an association database record 316 contained in the geographic database 116. The meeting point database record 314 includes a meeting point ID 314(1) by which the data record can be identified in the geographic database 116. Each meeting point database record 314 has associated with it information (such as "attributes", "fields", etc.) that describes features of the meeting point. The meeting point database record 314 may include data 314(2) that indicate a type of meeting point, such as a type used for a certain end user group.

The meeting point data record 314 includes data 314(3) that indicate the road segment ID (or pedestrian link ID) on or at which the meeting point is located. The meeting point data record 314 includes data indicating a location 314(4) of the meeting point, such as latitude, longitude (and altitude) coordinates. The meeting point data record 314 may include other data including images of the meeting point.

The association database records 316 provide a feature association model that defines an association or relationship between two or more database records selected from road segment database records 304, node database records 306, complex feature database records 308, cartographic feature database records 310, point of interest database records 312 and meeting point database records 314. The association members for the context of meeting points include a road segment associated with a meeting point, a point of interest associated with a meeting point, a cartographic feature associated with a meeting point, a complex feature associated with a meeting point, and a node associated with a meeting point, and an administrative area associated with a meeting point.

Each association database record 316 includes an ID 316(1) by which the data record can be identified in the geographic database 116. The association database record 316 includes data 316(2) that indicate a type of association, such as the type of geographic feature associated with the meeting point.

As shown in FIG. 6, the association data also includes attribute information of preferred name data 602. The preferred name data 602 includes an ID 602(1) by which the preferred name data record 602 can be identified in the geographic database 116. The preferred name database record 602 includes data 602(2) that indicate a preferred name when explicating the meeting point during guidance. The preferred name describes a visible characteristic or a visually distinguishing aspect of the feature, such as the color of the feature, shape of the feature, age of the feature, building materials of the feature, style of the feature, architectural description, decorative features, other visual properties including luster and sheen (shiny or dull) of the feature, motion or perceived motion of a portion of the feature, and/or any visible attribute that distinguishes the feature from other features in the surrounding area. For example, the special name may be pink building, red building, dome-shaped building, short-fat building, glass building, brick building, gothic architecture building, windowless building, tall building, neon sign of a bird attached to building, fountain in front of building, sculpture in front of building, and so on. In one embodiment, the preferred name may be a locally know name or nickname for the feature, such as "Malcolm Fountain." Alternatively, the preferred name is a base name, such as coffee shop, or a brand name. In one embodiment, more than one preferred name may be included in data 802(2), such as different preferred names for different end users (male, female, tourist and local resident).

V. Route Calculation and Route Guidance

As discussed above in conjunction with FIG. 1, the navigation system 100 includes navigation application software programs 110 that provide the various navigation features and functions. In one embodiment, the navigation functions and features may include route calculation 124. The route calculation function 124 receives a request to calculate a route to a desired destination. The request may be in the form of an identification of a starting location and a desired destination location. The identification of these locations may include the geographic coordinates of these locations. The route calculation function may also be provided with other data or parameters, such as route preferences. Given at least the identification of the starting location and the destination location, the route calculation function 124 determines one or more solution routes between the starting location and the destination location. A solution route is formed of a series of connected road segment over which the end user can travel from the starting location to the destination location.

When the route calculation function 124 calculates a route, it accesses the geographic database 116 and obtains the road segment data records 304 and/or other data. The route calculation function 124 may use various means or algorithms in determining solution routes. Methods for route calculation are disclosed in U.S. Pat. No. 6,192,314, the entire disclosure of which is incorporated by reference herein. (The methods disclosed in the aforementioned patent represent only some of the ways that routes can be calculated and the claimed subject matter herein is not limited to any particular method of route calculation. Any suitable route calculation method now known or developed in the future may be employed.)

The route calculation function 124 provides an output. In one embodiment, the output of the route calculation function 124 is in the form of an ordered list identifying a plurality of road segments, such as the road segment IDs 304(1) (i.e., seg1, seg2, seg3, . . . , seg(E), seg(F)) from the geographic database 116. The plurality of road segment IDs 304(1) represents the road segments that form the continuous navigable route between the origin and the destination that had been calculated by the route calculation function 124. (The route calculation function 124 may calculate more than one solution route.)

The route guidance function 126 uses the output of the route calculation function 124 to generate detailed directions or guidance messages for following the calculated route. The guidance messages may be prepared before the route is traveled or during travel of the route. The guidance messages are generally required at decision points along the route that require a maneuver.

Figure 7:
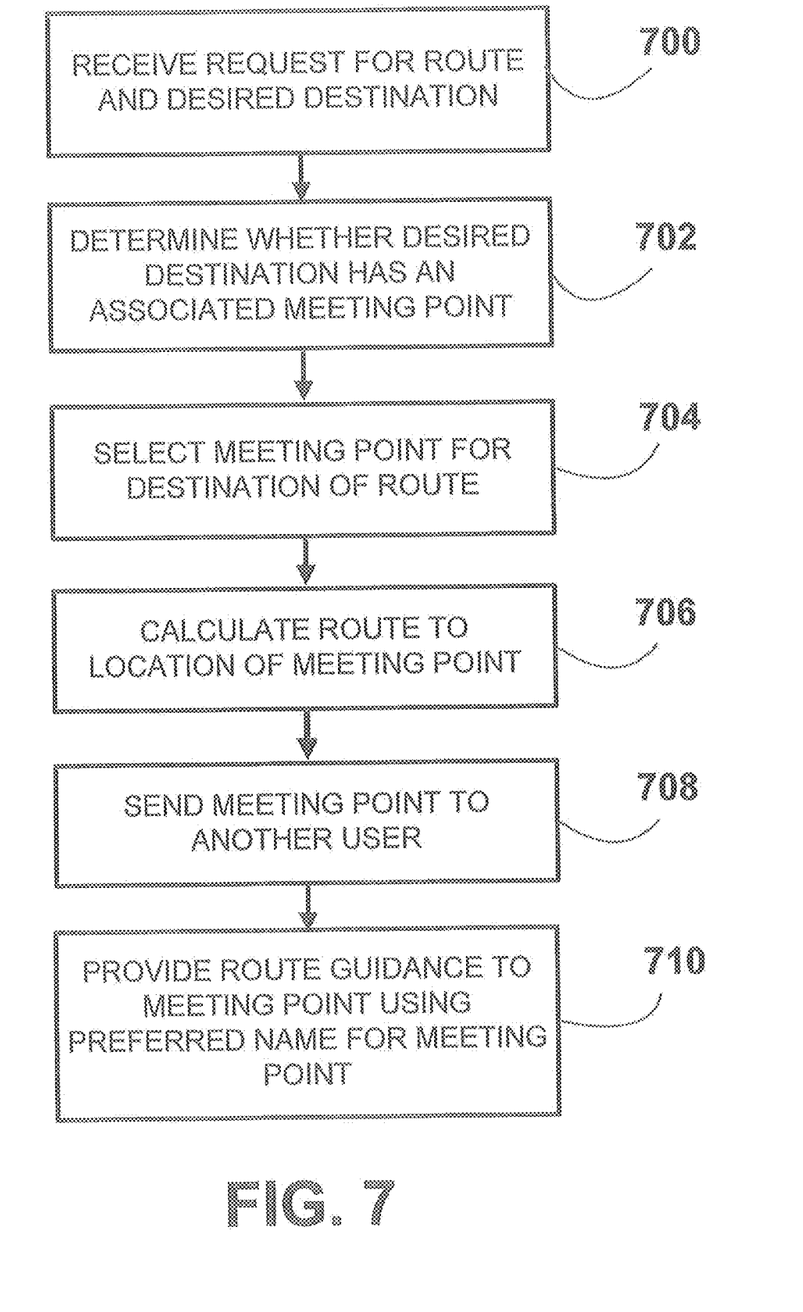
FIG. 7 is a flow chart for providing a route calculation and route guidance using meeting points.

FIG. 7 illustrates a flow chart of the steps for providing route calculation and guidance using meeting points. At step 700, the route calculation function 124 obtains a request for a route and obtains an origin and a desired destination for the route. In one embodiment, the user enters his or her desired destination using the user interface 114 of the navigation system 100. The desired destination may be entered as a street address, business name, and/or point of interest name as well as selected from point of interest categories. Using the positioning system 112, the positioning function 130 determines the origin; alternatively, the user enters his or her origin.

At step 702, the route calculation function 124 determines whether the desired destination has an associated meeting point. In one embodiment, the route calculation function 124 obtains association data 316 from the geographic database indicating any associations between the desired destination (point of interest, cartographic feature, road segment and so on) and meeting points. In another embodiment, if the desired destination is a point of interest, the route calculation obtains data indicating the type of point of interest 312(2). For example, the type data 312(2) indicates that the desired destination is a large scale point of interest, such as a stadium, that has associated meeting points. If the desired destination is associated with a meeting point, the method goes to step 704. However, if the desired destination is not associated with a meeting point, the route calculation function 124 prepares a route to the desired destination without changing the destination of the route to the location of the meeting point.

At step 704, the route calculation function 124 selects one of the associated meeting points for the substitute, new or refined destination of the route. In one embodiment, the route calculation function 124 obtains data 314(2) representing the type of the meeting point for the associated meeting points. The route calculation function 124 automatically selects the meeting point that matches the characteristics or preferences of the user. The route calculation function 124 retrieves data representing the characteristics or preferences of the users; the user has entered demographic information or preferences during previous use of the navigation system 100. For example, the route calculation function 124 identifies that the user is a teenager and selects the meeting point for teenagers. In another embodiment, the user is queried to select one of the meeting points. In this embodiment, the navigation system 100 provides a list of meeting points on display of the user interface 114 along with the corresponding type of the meeting point, and the user selects one of the meeting points.

At step 706, the route calculation function 124 calculates a route to the location of the selected meeting point. In one embodiment, the route calculation function 124 obtains data representing the location of the meeting point 314(5) from the geographic database 116 and uses the location of the meeting point as the new destination of the route. The route calculation function 124 determines at least one solution route for travel from the origin to the meeting point. The solution route comprises a series of road segments and pedestrian paths, including sidewalks and pedestrian links.

At step 708, the route calculation function 123 sends the meeting point to another user, such as a friend or a contact of the user of the navigation system 100. Meeting points are useful to help users find each other at large scale points of interest, such as stadiums and parks, and at other geographic features. In one embodiment, the route calculation function queries the user as whether the user wishes the meeting point be sent to other users, such as a group of friends. The user may enter the other users or select from contacts stored in memory associated with the navigation system 100. The meeting point is sent to the desired users as a text message, email, short message service message or other communication format and communication means.

At step 710, the navigation system 100 provides route guidance comprising maneuvers for following the route to the meeting point. The route guidance function 126 uses the output from the route calculation function 124 to provide maneuver instructions for travel to the meeting point on the calculated route. The route guidance function 126 generates an output comprised of a series of maneuvers derived from the list of road segments and pedestrian links provided in the output of the route calculation function 124. The output of the route guidance application is provided through the user interface 114 of the navigation system 100. The output of the route guidance may be conveyed audibly through speech synthesis or on a visual display. Using data that indicate the navigation system's current position, the route guidance function determines the appropriate times and locations at which to provide maneuvering instructions. The route guidance maneuvers instruct the user to turn in a specified direction at specified nodes (intersections) of the route. Methods for providing route guidance using geographic data are disclosed in U.S. Pat. No. 6,199,013, the entire disclosure of which is incorporated herein by reference. (The methods disclosed in the aforementioned patent represent only some of the ways that route guidance can be calculated and the claimed subject matter herein is not limited to any particular method of route guidance. Any suitable route guidance method now known or developed in the future may be employed.)

In one embodiment, the guidance function 126 generates a guidance message using the preferred name of the meeting point. For the example shown in FIG. 2, the guidance message references the fountain 216 as the meeting point. In the exemplary embodiment, the guidance function 126 obtains the preferred name 602(2) from the geographic database 116. For example, the fountain 216 has a preferred name of "big green fountain" that identifies its relative size and color. In other embodiments, the preferred name may be the words that describe visible characteristics or visually distinguishing element of the feature, such as the color, shape, age, building material, size, architectural style, decorative feature, luster, motion and/or any visible attribute that distinguishes the feature from other features in the surrounding area. In another embodiment, the preferred name may be a locally know name or nickname for the fountain. In one embodiment, the guidance function 126 chooses from more than one available preferred name based on characteristics of the end user, such as a preferred name for a female end user. In a further embodiment, the route guidance function 126 obtains an image of the meeting point from the geographic database 116 and displays the image of the meeting point on the display of the navigation system 100 when providing guidance to the meeting point.

Alternative embodiments for providing route calculation and guidance using meeting points are possible. In another embodiment, the user requests meeting points for a specified large scale point of interest. The navigation system 100 provides the meeting points associated with the specified large scale point of interest as well as a description of their respective type. For example, the user requests meeting points for the stadium 214, and the navigation system 100 provides the fountain 216 as a family meeting point and coffee shop 220 as a young adult meeting point. The user then selects one of the meeting points as the destination for a route and obtains the calculated route and guidance for following the route. Additionally, the user may specify to whom the meeting point should be sent, such as a listing of friends, and the navigation system 100 communicates the meeting point to computers associated with the listing of friends.

In another alternative embodiment, the user obtains the meeting points for a large scale point of interest from a web-based navigation services server. In this embodiment, the user communicates with the web-based navigation services server and the route calculation function 124 and the route guidance function 126 are implemented on the server. For example, the user's computing platform requests a route to a stadium, and the server provides several associated meeting points for the stadium to the user's computing device. The user then may select one of the meeting points and request that the selected meeting point be sent to a group of friends or contacts.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A computer-implemented method of operating a navigation system comprising:
    obtaining a request from a first user for a route to a first latitude and a first longitude for a large scale point of interest having multiple entrances, wherein the request includes user information indicative of a preferred meeting place type;
    obtaining data from a geographic database associated with the navigation system indicating a plurality of meeting points having an association with the large scale point of interest, wherein the plurality of meeting points are created as meeting points in the geographic database based on a determination that multiple people can meet at the meeting points, and wherein associations and meeting place types for individual meeting points of the plurality of meeting points are stored in the geographic database;
    selecting a selected meeting point location from the plurality of meeting points according to the preferred meeting place type in response to the request for the route to the first latitude and the first longitude for the large scale point of interest, wherein the selected meeting point is defined by a second latitude and a second longitude for a location within the large scale point of interest or proximate to the large scale point of interest;
    calculating a route to the second latitude and the second longitude of the selected meeting point location in response to the request for the route to the first latitude and the first longitude for the large scale point of interest; and
    sending the second latitude and the second longitude of the selected meeting point location to the navigation system.

2. The method of claim 1 further comprising:
    providing route guidance for following the route to the selected meeting point location, wherein the route guidance includes a guidance message stating a preferred name of the selected meeting point, wherein the preferred name is selected from a group consisting of a color of a feature associated with the selected meeting point location, a building material of the feature, a shape of the feature, an architectural style of the feature, a decorative element of the feature, and a local nickname of the feature.

3. The method of claim 1 further comprising:
    providing route guidance for following the route to the selected meeting point location, wherein the route guidance includes an image of the selected meeting point.

4. The method of claim 1 wherein the meeting point is associated with a feature visible to a pedestrian.

5. The method of claim 1 wherein the large scale point of interest is associated with several meeting points, each meeting point having a type indicating a user preference.

6. The method of claim 1 wherein the meeting point is created at a facility of a business owner that pays for the association of the selected meeting point with the large scale point of interest.

7. The method of claim 1 wherein the meeting point is established by a local resident recommendation.

8. A navigation system comprising:
    a processor,
    a geographic database in communication with the processor and configured to store a plurality of meeting points having an association with a large scale point of interest, and store a meeting point identification value for each of the plurality of meeting points that designate the plurality of meeting points as meeting points, wherein the meeting points are created in the geographic database based on a determination that multiple people can meet at the meeting points, and wherein associations and meeting place types for individual meeting points of the plurality of meeting points are stored in the geographic database, and
    a route calculation program executed on the processor, wherein the route calculation program is configured to:
        obtain a request from a user for a route to a first latitude and a first longitude for a large scale point of interest having multiple entrances, wherein the request includes user information indicative of a preferred meeting place type;
        obtain data from a geographic database associated with the navigation system indicating a plurality of meeting points having an association with the large scale point of interest, wherein the plurality of meeting points are created as meeting points in the geographic database based on a determination that multiple people can meet at the meeting points, and wherein associations and meeting place types for individual meeting points of the plurality of meeting points are stored in the geographic database;
        select a selected meeting point location from the plurality of meeting points according to the preferred meeting place type in response to the request for the route to the first latitude and the first longitude for the large scale point of interest, wherein the selected meeting point is defined by a second latitude and a second longitude for a location within the large scale point of interest or proximate to the large scale point of interest;
        calculate a route to the second latitude and the second longitude of the selected meeting point location in response to the request for the route to the first latitude and the first longitude for the large scale point of interest; and
        provide the second latitude and the second longitude of the selected meeting point location to the user.

9. The navigation system of claim 8 further comprising:
    a route guidance program for providing guidance messages following the route to the selected meeting point location.

10. The navigation system of claim 9, wherein the guidance message states a preferred name of the meeting point selected from a group consisting of a color of a feature associated with the meeting point, a building material of the feature, a shape of the feature, an architectural style of the feature, a decorative element of the feature, and a local nickname of the feature.

11. The navigation system of claim 9, wherein the guidance message includes an image of the meeting point.

12. The navigation system of claim 8 wherein the meeting point is a feature visible to a pedestrian.

13. The navigation system of claim 8 wherein at least one meeting point of the plurality of meeting points is created at a facility of a business owner that pays for the association of the meeting point with the point of interest.

14. The navigation system of claim 8 wherein the selected meeting point is located outside of the large scale point of interest.

* * * * *